Figure 3:
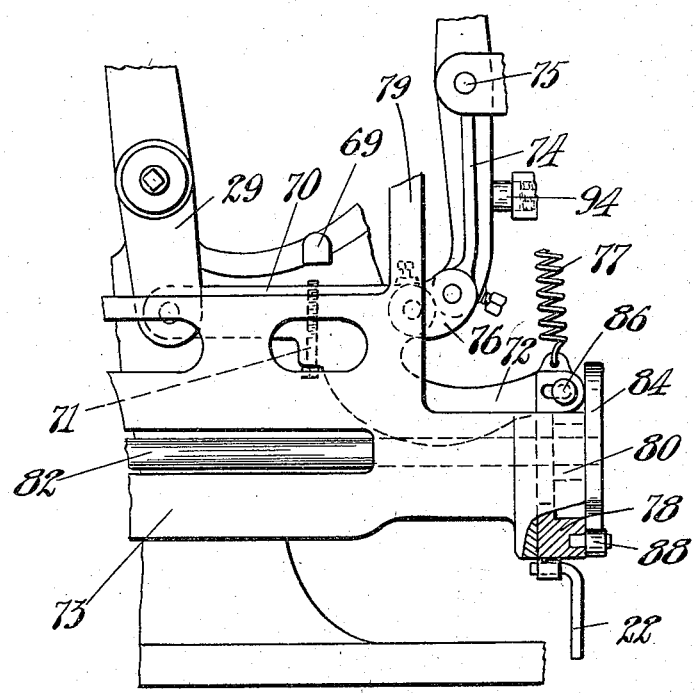

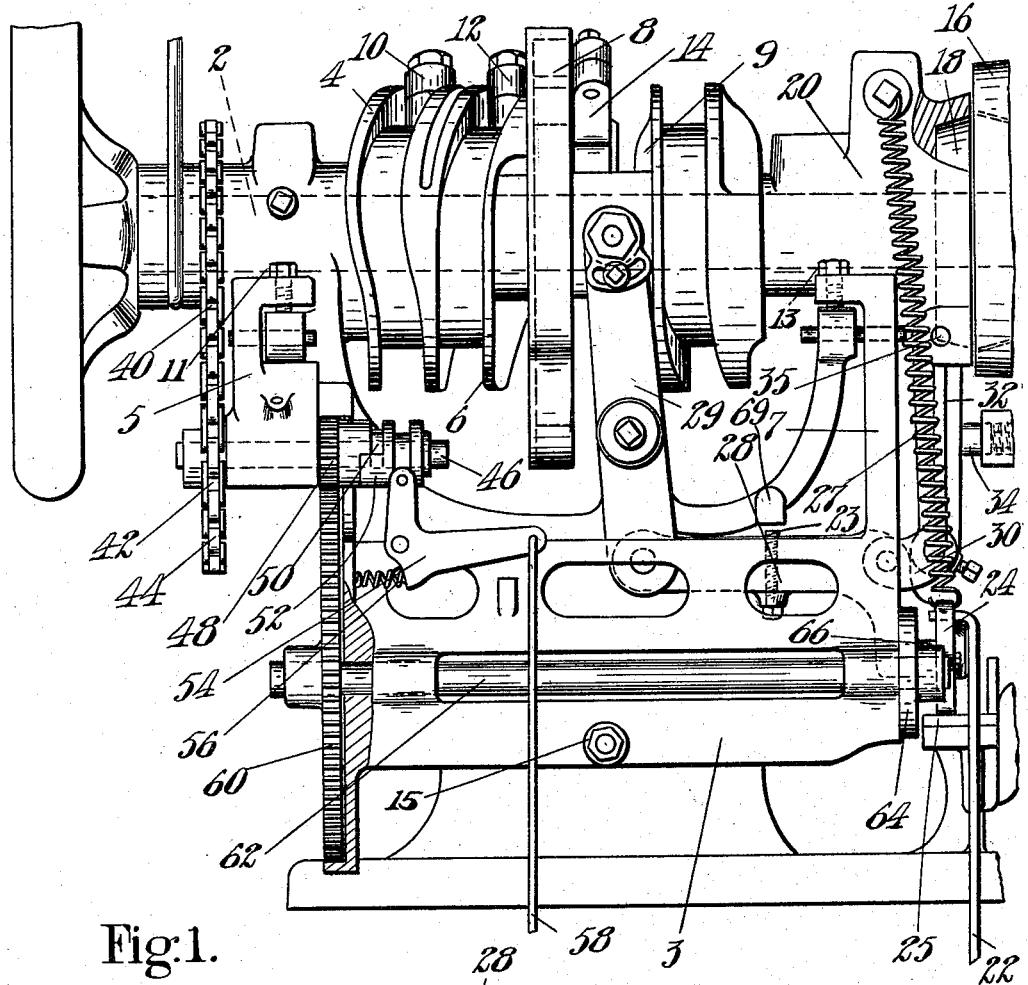

UNITED STATES PATENT OFFICE.

RALPH C. SIMMONS, OF BEVERLY, MASSACHUSETTS, ASSIGNOR TO UNITED SHOE MACHINERY COMPANY, OF PATERSON, NEW JERSEY, A CORPORATION OF NEW JERSEY.

STOPPING MECHANISM.

1,147,194. Specification of Letters Patent. Patented July 20, 1915.

Application filed May 15, 1909. Serial No. 496,218.

*To all whom it may concern:*

Be it known that I, RALPH C. SIMMONS, a citizen of the United States, residing at Beverly, in the county of Essex and State of Massachusetts, have invented certain Improvements in Stopping Mechanism, of which the following description, in connection with the accompanying drawings, is a specification, like reference characters on the drawings indicating like parts in the several figures.

This invention relates to machines for setting successively in sheet material a number of fasteners such as eyelets, studs, and the like, and more particularly the invention relates to mechanism whereby a machine of this type may be automatically stopped after setting a predetermined number of fasteners in the work.

It is advantageous, from an economical standpoint, to operate eyelet, hook setting machines and the like at a high rate of speed and heretofore work has been spoiled by the failure of the operator to stop the machine when the required fasteners have been set. This is particularly true in eyeleting men's boots where a predetermined number of eyelets have to be set in the lower part of the quarters, below a number of hooks previously set in the upper part of the quarters. In addition to the damage done to such work by setting an eyelet in the wrong place, there may be an objectionable waste of eyelets occasioned by the machine as, by reason of its inertia and the failure of the operator to release the treadle at the proper time, it continues to take eyelets from the raceway and clench them after the last eyelet has been set and the work removed.

With these considerations in view, it is an object of the present invention to provide, for a machine of the class referred to, simple and effective mechanism for automatically stopping the machine after any desired number of fasteners have been set in the work.

It is the general practice to equip machines for setting fasteners with clutch mechanism, whereby the setting devices and other coöperating elements of the machine may be connected with, and disconnected from a continuously driven member of the machine, and with a brake operative, when the clutch is thrown, to arrest the movement of these elements and stop the machine.

Another object of the present invention is to provide automatic stopping mechanism, which may be incorporated readily in fastener setting machines of the commercial types, which shall be adapted to act on said clutch mechanism to throw the clutch and apply the brake at the proper point in the cycle of the machine after the desired number of fasteners have been set.

While it is ordinarily desirable to have the machine operate without interruption till the predetermined number of fasteners have been set, it may be necessary occasionally to stop the machine after setting one or more eyelets. To anticipate such a contingency the present invention contemplates the provision of means whereby the automatic stopping mechanism may be thrown out of operation and the machine started and stopped by the normal action of the clutch actuated by the regular treadle as might be done in the absence of the automatic stopping mechanism.

While the mechanism forming the subject matter of the present invention may be incorporated advantageously in a machine for setting single fasteners, it is even more important to provide machines of the duplex type, that is, machines for setting two fasteners at a time, with such automatic stopping mechanism, since the damage and waste occasioned by the overrunning of a duplex machine is twice that resulting from the overrunning of a single machine. It is, accordingly, another object of the present invention to provide automatic stopping mechanism of such construction and arrangement as will permit of its being readily applied to duplex machines.

For purposes of illustration, the invention is herein shown as applied to a duplex eyelet-setting machine of the usual commercial type, although as above stated, the invention is not limited to this type of machine nor to eyelet-setting machines in general.

A preferred embodiment of the invention comprises a frame adapted to be detachably and adjustably connected with a machine for setting fasteners, said frame having mounted thereon intermeshing gears for which others of varying ratio may be substituted, according to the operation desired in the stopping mechanism. One of said gears is driven from the main shaft of the machine and another is connected with a cam shaft having a cam on its opposite end. The cam is arranged to act upon the locking device of the machine and maintain the clutch in its engaged condition, after the machine has once been put in operation, until a predetermined number of fasteners have been set and thereupon allow the clutch to be thrown and the brake applied. Between the gears of the stopping mechanism there is provided a clutch, under the control of the operator, for disconnecting the gears and thereby rendering the cam inoperative. By varying the relative size of the intermeshing gears the cam is caused to permit a different number of fasteners to be set before allowing the main clutch to be thrown and the brake applied.

In many types of fastener setting machines the clutch and brake mechanism are operated through the medium of a transmission device comprising a toggle and in such construction there is ordinarily provided a locking device for maintaining the toggle in alinement when this condition is required.

The above described embodiment of the present invention may be applied advantageously to a machine having such a locking device and may act upon this element. With slight modifications from the preferred embodiment, however, the invention may be applied to machines in which the locking device is omitted and such a modification is also illustrated in the accompanying drawings. The latter modification differs fom the former in that the automatic stopping mechanism in this case acts directly upon the clutch throwing members while in the preferred embodiment the automatic stopping mechanism acts on the clutch throwing members through the medium of the locking device.

The embodiments of this invention herein disclosed are simple in construction and effective and certain in operation. They are moreover so constructed that they may be embodied in machines already installed without difficulty. These advantages and others incident to the invention will be best understood and appreciated from the following description and accompanying drawings, in which—

Figure 4:
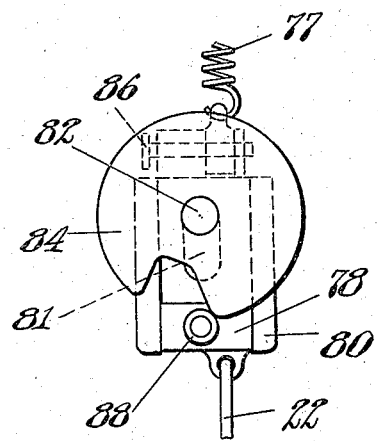

Figure 1 is a rear elevation of a duplex eyeleting machine equipped with automatic stopping mechanism; Fig. 2 is a perspective view of the locking device and the adjoining mechanism; Figs. 3 and 4 illustrate the automatic stopping mechanism as applied to a machine from which the locking device is omitted.

The duplex eyeleting machine shown in Fig. 1 is provided with a main shaft 2 which actuates the eyelet setting devices through the cams 4, 6, 8 and the levers 10, 12, 14. The shaft 2 is driven from the pulley 16 through a clutch which comprises a friction member 18 axially movable on the shaft 2 and splined thereto. The friction member has two oppositely disposed conical friction surfaces, one of which, when the clutch is in engaging position, fits into a correspondingly shaped concaved friction surface on the pulley 16 and the other of which, when the clutch is disengaged, engages with a rigid friction surface on the frame 20, which serves as a brake and arrests the rotation of the friction member and shaft. The friction member 18 is moved back and forth axially on the shaft by means of a shifting arm 32 pivoted at 35 and forked at its upper end to engage the friction member. A spring actuated plunger 34, mounted in a recess in the frame of the machine, tends to hold the shifting arm 32, when unimpeded, in a position to cause the clutch to engage, that is, to cause the friction member to engage the pulley 16. The action of the plunger 34 is opposed in moving the shifting arm 32 to throw the clutch for stopping the machine by a lever 29 which is actuated periodically by the clutch throwing cam 9 on the shaft 2 at the proper point in the cycle of the machine. The above described devices are similar to the corresponding parts described and illustrated in Letters Patent of the United States, No. 672,056, dated April 16, 1901, and for further understanding of said devices and their operation reference may be had to said patent.

The action of the cam actuated lever 29 is communicated to the friction member 18 through transmission devices, comprising a toggle made by the link 28 and the link 30, together with the shifting arm 32. When the toggle links are in alinement, effective communication is established between the clutch throwing cam 9 and the clutch so that the cam will act at the proper time to disengage the clutch, but when the toggle is broken effective communication is interrupted and until the toggle links are again brought into alinement the spring plunger 34 will hold the clutch in engagement to drive the shaft.

The toggle link 30 is pivoted to the lower end of the shifting lever 32 and the toggle link 28 is pivoted to the lower end of the cam actuated lever 29. A machine driven by the shaft 2 is stopped by alining the toggle links so that the cam 9 may act to disengage the clutch through the rigid arm thus constituted by the links. The stop pin 23 on the link 28 coöperates with the abutment 69 on the machine frame for determining the alined position of the toggle. Accidental breaking of the toggle is prevented by the locking cam 24 pivoted by a pin 26 to a downwardly projecting portion of the link 28 and engaging the bearing plate 25 as shown in Fig. 2 and in this position the toggle 28, 30, is held straight. However, when the treadle rod 22 is depressed the locking cam 24 is rotated in the direction of the arrow (Fig. 2) to unlock the toggle and, after abutting on the stop 39 on the link 28, continued downward movement of the treadle rod 22 will break the toggle and allow the lever 32 to throw the clutch into engagement for starting the machine. The spring 27 tends normally to turn the locking cam 24 into its locking position and straighten the toggle and is opposed by the movement of the treadle rod 22.

It will be apparent that so long as the treadle rod 22 is held down and the toggle 28, 30 kept broken the spring plunger 34 will retain the shifting arm 32 in such a position that the clutch shall engage the driving pulley and the machine continue to operate while the periodic motion of the cam actuated lever 29 will be ineffective. As already pointed out in dealing with a high speed machine it is difficult for the operator to release the treadle rod and stop the machine at exactly the desired point. To this end the following mechanism is provided for holding the locking cam 24 in its unlocked position, and thereby maintaining the toggle broken and the clutch engaged until the machine has set a predetermined number of fasteners, and then allowing the spring 27 to straighten the toggle whereby the cam actuated lever 29 may operate to stop the machine at the proper point in its cycle. Upon the locking cam 24 is mounted a roller 66 and mounted on the end of the cam shaft 62 is a rotatable cam 64 so shaped as to act on the roller 66 and hold the locking cam in its unlocked position except at one point in the periphery of the rotatable cam. The cam shaft 62 is journaled in the detachable frame 3 and has a large gear 60 on its opposite end. The gear 60 meshes with the gear 48 fast on a sprocket shaft 46, also journaled in the frame 3 and being provided with a sprocket wheel 42 which is driven by a chain 44 from a second sprocket wheel 40 on the main shaft 2 of the machine. Other gears may be substituted for the gears 48 and 60 and by varying their relative size the cam 64 can be made to revolve once for every four, five, or any desired number of revolutions of the main shaft 2 according to the number of fasteners it is desired to set.

The detachable frame 3, in which the stopping mechanism is mounted, is provided with arms 5 and 7 by which it is hinged to the main frame of the machine. To this end the arms 5 and 7 are adapted to be pivoted to suitable lugs projecting outwardly from the main frame and inwardly extending projections on the arms are provided with adjusting screws 11 and 13 which, together with the adjusting screw 15 in the lower part of the frame, serve to adjust and hold the detachable frame rigid with respect to the machine. By adjusting the frame as above indicated, the tension of the chain 44 may be regulated and the proper relative location of the roller 66 and cam 64 insured.

In operation the operator depresses the treadle rod 22 for starting the machine and in so doing turns the locking cam 24 and breaks the toggle 28—30 allowing the clutch to be engaged by the action of the spring plunger 34 through the shifting lever 32. The turning movement of the locking cam 24 carries the roller 66 out of engagement with the cam 64 which is set in motion through the gears 48, 60 as already stated. The operator releases the treadle immediately and the spring 27 tends to straighten the toggle, but straightening of the toggle is prevented by the roller 66 which engages the periphery of the cam 64. The cam 64 makes one rotation while the machine makes the required number, in accordance with the ratio of the gears 48 and 60 and when it has completed its revolution it allows the roller to enter the recess or depression 65 whereupon the toggle is straightened by the spring 27, the clutch thrown and the brake applied by the clutch cam at the proper point in the cycle of the machine.

In order to render the stopping mechanism inoperative when desired without necessitating its removal from the machine the gear 48 may be unclutched from the sprocket shaft 46 through the medium of an auxiliary treadle and treadle rod 58. To this end, a flattened coller 50 is formed integral with or otherwise made fast to the sprocket shaft 46. As shown in Fig. 1 the flat side of the collar 50 is in horizontal position, its edge only being visible. In sliding engagement with the shaft and collar is the movable member 52 of a clutch, said member being toothed to engage with a correspondingly toothed hub on the gear 48. The clutch members are so designed that they can engage only when in a predetermined relation so that the timing of the cam 24 will not be varied in throwing the automatic stopping mechanism into and out of operation. A bell crank shifting lever 54 is pivoted to the frame 3 and held normally in a clutch engaging position by the spring 56. By depressing the treadle rod 58 the effective connection between the sprocket shaft 46 and the rotatable cam 64 is broken and the machine may be started and stopped independently of the automatic stopping mechanism above described.

In Fig. 3 there is shown the clutch operating mechanism of a machine for setting fasteners from which a locking device, similar to the locking cam 24 shown in Fig. 2 is omitted. In this construction the friction member of the clutch is moved for starting the machine by the spring plunger 94 acting through the shifting lever 74 pivoted at 75, and for disengagement by the cam actuated lever 29 as in the previously described construction. The motion of the cam actuated lever 29 is transmitted to the shifting lever 74 by the toggle links 70 and 76. When the toggle links are in alinement effective communication is established between the cam actuated lever 29 and the clutch so that the lever will act at the proper time to disengage the clutch, but when the toggle is broken effective communication is interrupted and, until the toggle links are again brought into alinement, the spring plunger 94 will hold the clutch in engagement. As in the previously described construction the stop pin 71 coöperates with the abutment 69 to determine the alined position of the toggle links and the spring 77 tends always to move the toggle into its alined position. The toggle link 70 is provided with an arm on which the treadle rod 22 acts, and it will be apparent that by depressing the treadle rod the toggle will be broken and the machine put in motion.

In order to prevent the toggle from being straightened before the machine has made the desired number of revolutions the detachable stopping mechanism of the previously described construction is modified to act directly on the arm of the toggle link 70. To this end, a detachable frame 73 is provided in which is journaled the cam shaft 82 having mounted on its outer end the cam 84. Guideways 80 are formed in the frame and a slide 78 is interposed in the guideways between the treadle rod and the arm of link 70 and upon the outer face of the slide 78 is mounted the roller 88. The slide is attached to the arm by the pivot pin 86 and is slotted at 81 to permit the passage of the cam shaft 82.

When the operator depresses the treadle rod 22 for starting the machine the roller 88 is moved out of engagement with the cam 84 which is set in motion by suitable gearing as described in connection with Fig. 1. The operator immediately releases the treadle rod 22 but the cam 84 prevents the action of the spring 77 from straightening the toggle and stopping the machine until it has made a complete revolution when the roller is allowed to enter the recess in the periphery of the cam, as shown in Fig. 4, and the machine is stopped by the action of the cam actuated lever 29 through the rigid arm formed by the alined toggle links.

Having described my invention, what I claim as new and desire to secure by Letters Patent of the United States is:—

1. A machine of the class described having, in combination, a frame, a driven shaft journaled therein, a clutch mounted on said shaft, together with an auxiliary frame secured to the machine frame and having provision for adjustment, automatic stopping mechanism carried by the auxiliary frame and connected to the clutch, and independent driving connection between the driven shaft of the machine and the stopping mechanism.

2. A machine of the class described having, in combination, a frame having a driven shaft journaled therein, a clutch on said shaft, transmission devices for shifting the clutch, a rotatable lock for holding the transmission devices in operative position, and an auxiliary frame having automatic stop-controlling mechanism mounted therein, said mechanism being arranged to act through the rotatable lock.

3. A machine of the class described having, in combination, a clutch, a transmission device operatively connected to the clutch but being normally ineffective for throwing the clutch during the continuous running of the machine, means operating periodically to move said transmission device, and automatic mechanism for rendering said transmission device effective for throwing the clutch when said device is moved at the completion of a predetermined number of operations by the machine.

4. A machine of the class described having, in combination, a driving pulley and a driven shaft, together with mechanism for automatically stopping the machine after a predetermined number of operations, said mechanism comprising a clutch, a clutch throwing cam located at a distance from the clutch, clutch shifting members interposed between said cam and clutch and movable to transmit motion from the cam to the clutch, and automatic stopping mechanism arranged to act on said movable clutch shifting members at the completion of a predetermined number of operations of the machine.

5. A machine of the class described having, in combination, a driven shaft, a clutch, means for actuating the clutch, a clutch lock 24 for maintaining the clutch-actuating means ineffective and thereby preventing accidental starting of the machine, and stop-controlling mechanism including a rotatable locking member 64 arranged to operate through the clutch lock.

6. A machine of the class described having, in combination, a driven shaft, a clutch, means for actuating the clutch, a rotatable clutch lock for controlling said means and holding the machine at rest, and stop-controlling mechanism including a cam arranged to prevent, for a predetermined interval, the clutch lock from assuming a position wherein the machine will be stopped.

7. A machine of the class described, having in combination, a driven shaft, together with a detachable frame, automatic stopping mechanism carried by the frame and a clutch also carried by the frame for interrupting effective connection between the elements of said automatic stopping mechanism, substantially as described.

8. A machine of the class described having, in combination, a frame, a driven shaft journaled therein, and a clutch, together with an auxiliary frame detachably secured to said machine frame and having provision for adjustment about an axis parallel to said shaft, and automatic stopping mechanism carried by said frame and operatively connected with said clutch.

9. A machine of the class described, having in combination, driving means, a driven shaft, a clutch, and means for throwing said clutch, together with rotatable means for preventing such action, mechanism acting normally to rotate said latter means when the machine is in operation, and a second clutch for disconnecting said latter means without affecting said first mentioned clutch, substantially as described.

10. A machine of the class described, having in combination, a driven shaft, and a toggle operated clutch for starting and stopping said shaft, together with a locking device for said toggle and mechanism operating through the locking device to prevent stopping of the machine before a predetermined number of successive operations, substantially as described.

11. A machine of the class described, having in combination, driving means, a driven shaft, and a toggle operated clutch for starting and stopping said shaft, together with a locking device for said toggle, means tending to straighten the toggle, and mechanism operating through the locking device to prevent the straightening of the toggle before a predetermined number of operations have been made, substantially as described.

12. Automatic stopping mechanism for a duplex fastener setting machine having clutch and brake mechanism, comprising a detachable frame having mounted thereon interchangeable gears, means for driving said gears from said fastener setting machine, a cam actuated by one of said interchangeable gears, clutch throwing means periodically operating, and a stud engaging said cam thereby preventing the throwing of the clutch except at a predetermined point in the periphery of said cam.

13. A machine of the class described, having in combination, driving means, a driven shaft and a clutch mechanism for stopping and starting said shaft, together with a hinged frame, mechanism carried thereby for preventing the action of said clutch for stopping the machine before a predetermined number of operations have been made, and means for adjustably holding said frame in position on said machine, substantially as described.

In testimony whereof I have signed my name to this specification in the presence of two subscribing witnesses.

RALPH C. SIMMONS.

Witnesses:
ARTHUR L. RUSSELL,
HERBERT W. KENWAY.

Copies of this patent may be obtained for five cents each, by addressing the "Commissioner of Patents Washington, D. C."